US010974462B2

(12) United States Patent
Shriver et al.

(10) Patent No.: US 10,974,462 B2
(45) Date of Patent: Apr. 13, 2021

(54) FASTENER AND METHOD FOR JOINING DISSIMILAR MATERIALS

(71) Applicant: The Regents of the University of Michigan, Ann Arbor, MI (US)

(72) Inventors: Daniel G. Shriver, Ann Arbor, MI (US); Shixin Jack Hu, Ann Arbor, MI (US); Mihaela Banu, Ypsilanti, MI (US); Kaifeng Wang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 790 days.

(21) Appl. No.: 15/736,594

(22) PCT Filed: Jun. 16, 2016

(86) PCT No.: PCT/US2016/037905
§ 371 (c)(1),
(2) Date: Dec. 14, 2017

(87) PCT Pub. No.: WO2016/205541
PCT Pub. Date: Dec. 22, 2016

(65) Prior Publication Data
US 2018/0169962 A1 Jun. 21, 2018

Related U.S. Application Data

(60) Provisional application No. 62/180,284, filed on Jun. 16, 2015.

(51) Int. Cl.
*F16B 5/08* (2006.01)
*B29C 65/56* (2006.01)
(Continued)

(52) U.S. Cl.
CPC .......... *B29C 65/562* (2013.01); *B29C 66/112* (2013.01); *B29C 66/1122* (2013.01);
(Continued)

(58) Field of Classification Search
CPC ... B29C 66/561; B29C 66/562; B29C 66/524; B29C 66/526; B29C 66/534;
(Continued)

(56) References Cited

U.S. PATENT DOCUMENTS

| 7,267,736 B2 | 9/2007 | Hou et al. | |
| 2008/0107499 A1* | 5/2008 | Denham | ................ F16B 29/00 411/548 |

FOREIGN PATENT DOCUMENTS

| EP | 0268957 A1 | 6/1988 |
| JP | H08159126 A | 6/1996 |

(Continued)

OTHER PUBLICATIONS

L.W. Cheah, "Cars on a Diet: The Material and Energy Impacts of Passenger Vehicle Weight Reduction in the U.S"., Ph.D. Thesis, Engineering Systems Division, MIT, Sep. 2008, 121 pages.
Y. Liu, et al., "Single-sided Piercing Riveting for Adhesive Bonding in Vehicle Body Assembly", Journal of Manufacturing Systems vol. 32, May 2013, pp. 498-504.
(Continued)

*Primary Examiner* — Daniel J Wiley
(74) *Attorney, Agent, or Firm* — Reising Ethington P.C.

(57) ABSTRACT

A fastener and method for joining dissimilar materials. The fastener has a metal body and a hollow portion. The method includes the steps of: layering a thermoplastic first component with a second component such that the first component covers an opening formed through the second component; pressing the metal fastener against the first component through the opening in the second component; and heating the thermoplastic at an interface of the metal fastener and the first component so that the thermoplastic flows into the hollow portion of the metal fastener during the step of
(Continued)

pressing. A portion of the metal fastener is thus embedded in the thermoplastic and a joint is formed that attaches the first and second components together when the thermoplastic is cooled.

20 Claims, 2 Drawing Sheets

(51) Int. Cl.
*F16B 11/00* (2006.01)
*B29C 65/00* (2006.01)

(52) U.S. Cl.
CPC .............. *B29C 66/21* (2013.01); *B29C 66/43* (2013.01); *B29C 66/7392* (2013.01); *B29C 66/8322* (2013.01); *F16B 5/08* (2013.01); *F16B 11/00* (2013.01); *B29C 66/71* (2013.01); *B29C 66/721* (2013.01); *B29C 66/7212* (2013.01); *B29C 66/742* (2013.01)

(58) Field of Classification Search
CPC ......... B29C 66/112; B29C 66/43; F16B 7/02; F16B 7/025; F16B 7/18; F16B 7/22; F16L 35/08
See application file for complete search history.

(56) References Cited

FOREIGN PATENT DOCUMENTS

| JP | 2013059770 A | 4/2013 |
|---|---|---|
| JP | 2013148122 A | 8/2013 |

OTHER PUBLICATIONS

S.M. Goushegir, et al., "Friction Spot Joining of Aluminum AA2024/carbon-fiber Reinforced poly(phenylene sulfide) Composite Single Lap Joints: Microstructure and Mechanical Performance", Materials and Design vol. 54, in 2014, pp. 196-206.
Frost and Sullivan, "Innovations in Multi-material Joining Technologies (Technical Insights)", Nine Dimensional Technology Assessment, Jun. 2013, 71 pages.
"Self-Piercing Rivets", Assembly Magazine, Sep. 2002, 6 pages.
"Screw, Nut and Bolt Manufacturing in the U.S.", IBIS World Industry, Report 33272, Dec. 2014, 38 pages.
J Zhang, et al., "Self-piercing Riveting of Aluminum Alloy and Thermoplastic Composites", Journal of Composite Materials vol. 49 (12), May 2014, pp. 1493-1502.
International Search Report for International application No. PCT/US2016/037905, dated Sep. 12, 2016, 3 pages.
Written Opinion for International application No. PCT/US2016/037905, dated Sep. 12, 2016, 9 pages.

\* cited by examiner

FASTENER AND METHOD FOR JOINING DISSIMILAR MATERIALS

TECHNICAL FIELD

The present disclosure relates generally to composite panel assemblies constructed from dissimilar materials and, more particularly, to joining the dissimilar materials together with a fastener.

BACKGROUND

There is a growing movement in modern automotive vehicles to utilize lightweight, high-strength materials in the manufacturing of various vehicle structures. One of the most promising such high strength materials is fiber reinforced polymer composites. These composites are typically made using a thermoplastic polymers as the base matrix.

When building lightweight hybrid structures, it is necessary to be able to join the different materials. One of the most commonly-needed joints are spot welds to connect these newer fiber composites to metals. Current solutions to joining these types of structures present difficulties in reliability and flexibility for different materials and applications. There is therefore needed an improved fastener and method for joining at least these types of dissimilar materials.

SUMMARY

In accordance with an aspect of the invention, there is provided a method of joining materials comprising the steps of: layering a first component comprising a thermoplastic with a second component such that the first component covers an opening formed through the second component; pressing a metal fastener against the first component through the opening in the second component; and heating the thermoplastic at an interface of the metal fastener and the first component so that the thermoplastic flows into a hollow portion of the metal fastener during the step of pressing. A portion of the metal fastener is thus embedded in the thermoplastic and a joint is formed that attaches the first and second components together when the thermoplastic is cooled.

In different embodiments, the method may include any of the following features, considered alone or according to any technically feasible combination:

the step of heating may be performed before the step of pressing.
during heating, the thermoplastic flows into the hollow portion of the metal fastener at an end of the metal fastener.
as a result of the heating step, an end of the metal fastener is embedded in the first component at the formed joint.
the method may further comprise the step of piercing the first component with the metal fastener.
during heating, the thermoplastic flows through an aperture formed through a body of the metal fastener during the step of pressing to form a mechanical interlock between the thermoplastic and the metal fastener when the joint is formed.
the metal fastener may include an undercut feature along the hollow portion to form a mechanical interlock between the thermoplastic and the metal fastener when the joint is formed.
the method may further comprise the step of venting gas away from the heated thermoplastic.
the first component may comprise a composite material including the thermoplastic and reinforcing fibers, and the second component may comprise sheet metal.
the first component may comprise reinforcing fibers and the method may further comprise the step of changing the orientation of some of the reinforcing fibers during the step of pressing.

In accordance with another aspect of the invention, there is provided a composite assembly, comprising: a first component comprising a thermoplastic; a second component having an opening extending therethrough from a first side that faces the first component to an opposite second side; and a metal fastener attaching the components together. The metal fastener has a shoulder at the second side of the second component and a hollow body extending from the shoulder and through the opening of the second component. The hollow body is at least partly embedded in and filled with the thermoplastic of the first component.

In different embodiments, the composite assembly may include any of the following features, considered alone or according to any technically feasible combination:

the opening through the second component may be sized for clearance between the hollow body and the second component.
the hollow body may extend from the shoulder to an end that is embedded in the first component.
the hollow body may extend from the shoulder and through the first component to a free end.
the metal fastener may comprise an aperture formed through the hollow body, the thermoplastic extending through the aperture to form a mechanical interlock between the first component and the metal fastener.
the metal fastener may comprise an undercut feature embedded in the thermoplastic that forms a mechanical interlock between the first component and the metal fastener.
the metal fastener may comprise a head with the hollow body extending in a lengthwise direction from the head to an end and an opening extending through the entire length of the metal fastener through the hollow body and the head.
the first component may comprise a composite material including the thermoplastic and reinforcing fibers, with at least some of the reinforcing fibers being aligned with internal and external surfaces of the hollow body.
the second component may comprise sheet metal.
the hollow body may extend from the shoulder to an end that has a diameter no larger than the remainder of the hollow body.

BRIEF DESCRIPTION OF THE DRAWINGS

Illustrative embodiments will hereinafter be described in conjunction with the appended drawings, wherein like numerals denote like elements and wherein.

DESCRIPTION OF THE ILLUSTRATED EMBODIMENTS

Described below is a composite assembly that includes two different components attached together at a joint by a fastener having a hollow portion. One of the components includes a thermoplastic material that flows into the hollow portion of the fastener under the influence of heat and pressure during a method of making the composite assembly. The joint is formed when the thermoplastic material cools and resolidifies with at least a portion of the fastener embedded in the component that includes the thermoplastic material. The resulting joint is useful to attach components fabricated from different materials. In particular, the resulting joint is useful to attach a metal component, such as a sheet metal component, together with a thermoplastic-based material, such as a fiber-filled thermoplastic composite in a simple and efficient manner by pressing the fastener into the thermoplastic composite from an accessible side of the components to be joined.

In one particular example, the composite assembly is part of a vehicle body, which can be made lightweight via replacement of traditional metal components with thermoplastic-based materials. In such applications, full replacement of metal with thermoplastic components is not feasible because thermoplastics relax or creep over long periods of time. Thus, in order to reduce weight or attain other advantages provided by thermoplastic materials, a robust technique for attaching such materials to metals is necessary. As described in further detail below, the structures and methods described herein offer advantages, capabilities, and feasibility over other joints and joint forming techniques such as spot welding, self-piercing riveting, rivet-welding, friction spot joining, chemical or adhesive bonding, ultrasonic welding, and induction welding.

Figure 1:
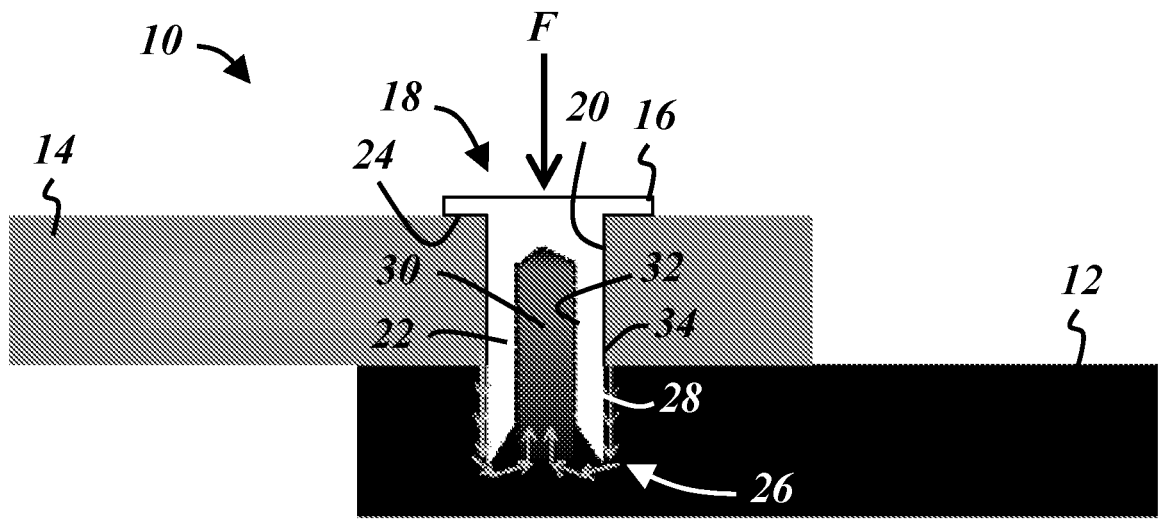
FIG. 1 is a cross-sectional view of an example of a composite assembly including two components attached together at a joint formed in part by a fastener having a hollow body, where material flow during assembly is schematically illustrated.

FIG. 1 is a cross-sectional view of a portion of an embodiment of a composite assembly 10 including a first component 12, a second component 14, and a fastener 16 attaching the two components together at a joint 18. The first component 12 includes a thermoplastic material and, in one example, is fabricated from a thermoplastic composite material including a reinforcement material distributed within a thermoplastic matrix comprising the thermoplastic material. It is possible that only the portion of the first component 12 located at the joint 18 includes the thermoplastic material. In other cases, the entire first component 12 includes the thermoplastic material and/or is fabricated from the thermoplastic composite material. For example, the first component 12 may be a sheet of carbon fiber composite (CFC) material including the thermoplastic matrix material with carbon reinforcement fibers distributed within the matrix material (also referred to as carbon-fiber thermoplastic composite or CFTC). Any type of thermoplastic can be used (e.g., polyamide, polyolefin, ABS, poly(phenylene sulfide), alloys, blends, copolymers, etc.), and fiber or non-fiber reinforcements other than carbon can be used (e.g., glass fibers, natural fibers, Kevlar fibers, or mica or other mineral fillers). Where fibers are employed, they are preferably discontinuous or chopped fibers and may be more suitable as short fibers on a size scale less than that of the fastener 16. In one embodiment, the first component is in sheet or other form and has a thickness, measured in the longitundal direction of the fastener, of 3 mm or more.

FIG. 1 also depicts certain material flow characteristics during a method of making the composite assembly. The method may include the steps of layering the first component 12 with the second component 14 such that the first component 12 covers a pre-formed opening 20 in the second component 14, pressing the fastener 16 against the first component 12 through the opening 20 in the second component. The opening 20 is sized to allow a hollow portion 22 of the fastener 16 to freely pass through the opening to press against the first component 12 and to prevent a shoulder 24 of the fastener 16 from passing through the opening. For example, the opening 20 may be sized to provide clearance between the second component 14 and the hollow portion 22 of the fastener 16 such that, in the absence of the first component 12, the hollow portion of the fastener can pass through the opening 20 in the axial direction with zero applied force or under the fastener's own weight. The shoulder 24 may be generally flat or otherwise contoured to fit the shape of the surface of the second component with which it interfaces in the finished assembly.

In some embodiments, the method includes the step of forming the opening 20 at a desired location in the second component (e.g. a sheet metal component) by punching, drilling, or other suitable technique. In various examples, the second component is sheet metal in the form of aluminum, aluminum alloy, magnesium, magnesium alloy, titanium, titanium alloy, or advanced high strength steel (AHSS). The sheet metal may have a thickness in a range from 0.5 mm to 5.0 mm.

The method may also include causing the thermoplastic material to flow into the hollow portion 22 of the fastener when a force F is applied to the fastener 16 as shown, causing the thermoplastic material to flow as generally indicated by the arrows indicating a flow field 26 along which the thermoplastic material and/or reinforcements flow from the first component 12 into the hollow portion 22 of the fastener 16. Causing the thermoplastic material to flow may be effected by localized heating of the thermoplastic at an interface 28 of the fastener 16 and the first component 12. In one embodiment, the fastener 16 is heated to a temperature sufficient to soften or at least partly liquefy the thermoplastic material to a viscosity sufficiently low that the thermoplastic material flows under the pressure defined by the applied force F and the area of the interface 28 at any given time during the step of pressing.

The fastener 16 may be metal and preheated to the desired temperature prior to being pressed against the first component 12. For example, the fastener 16 may be obtained from a source of heated fasteners and pressed into place immediately upon being obtained from the source. In another example, the fastener 16 may be obtained and heated while fixture and awaiting the step of pressing, such as by conductive, convective, radiant heat, and/or by induction heating. The fastener 16 may also be pressed against the first component 12 through the opening 20 in the second component 14 with a preload, then heated and pressed into the first component 12 to cause the thermoplastic to flow. Other methods of heating the interface 28 are contemplated, such as providing ultrasonic energy at the interface via the fastener 16 and/or the first component 12 or locally heating the thermoplastic material in any manner that does not necessarily include heating the fastener.

The combined pressing and heating at the interface 28 results in a portion of the fastener 16 being embedded in the thermoplastic material and the hollow portion of the fastener being at least partially filled with the thermoplastic material, thereby forming the joint 18 that attaches the components 12, 14 together when the thermoplastic material is cooled—e.g., when the thermal energy stored in or provided via the fastener 16 is sufficiently depleted. The joint 18 generally includes at least a portion of the fastener 16, a portion of the first component 12 where the thermoplastic has been reformed or reshaped by the heating and pressing, and a portion of the second component constrained between the first component 12 and the shoulder 24 of the fastener 16. In the example of FIG. 1, the retaining force causing the joint 18 to hold the assembly 10 together is provided at least in part by a frictional fit between a reformed portion 30 of the material of the first component 12 and internal and external surfaces 32, 34 of the hollow portion of the fastener 16. Shrinkage of the thermoplastic material on cooling, which may generally be of a greater magnitude than shrinkage of the fastener on cooling, also serves to provide a frictional fit, particularly at the external surfaces 34 of the fastener. Depending of the affinity of fastener material with the particular type of thermoplastic material used, adhesive forces at the final interface 28 may also provide part of the retaining force. In embodiments where the fastener 16 and the second component 14 are non-polymeric, such as metal, the material of the first component 12 is the only material that flows and that is reshaped to form the joint 18.

Figure 2:
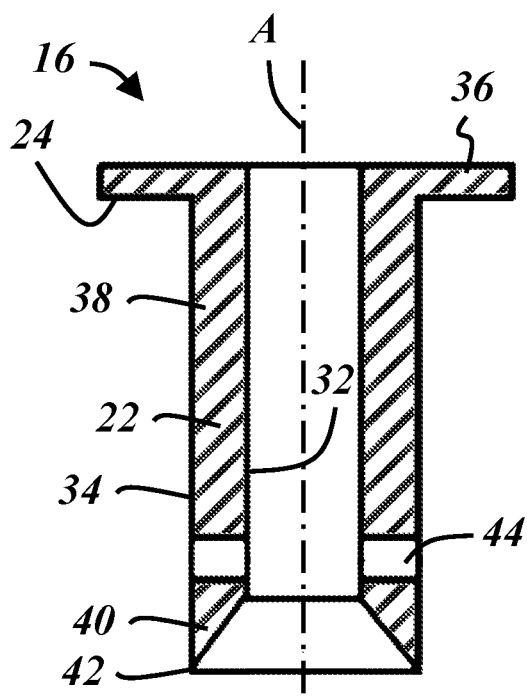
FIG. 2 is a cross-sectional view of an example of the fastener with apertures for forming a mechanical interlock at the joint.
Figure 3:
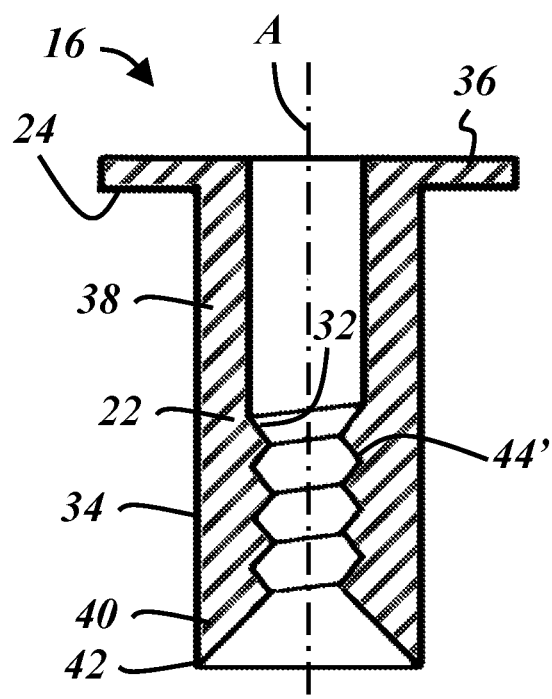
FIG. 3 is a cross-sectional view of an example of the fastener with internal threads for forming a mechanical interlock at the joint.

FIGS. 2 and 3 are cross-sectional views illustrating variations of the fastener 16 that include many of the features of the fastener 16 illustrated in FIG. 1 along with certain additional features. Each illustrated fastener 16 includes a head 36 and a body 38 extending from the head to an end 40, with the overall configuration resembling that of a rivet. The head 36 includes the shoulder 24 from which the body 38 extends. A side of the head 36 of the fastener 16 opposite the shoulder 24 and facing away from the components 12, 14 may also be flat and provide a surface for application of the pressing force and/or a heat source (e.g., a conduction heat source). The hollow portion 22 of each illustrated fastener 16 is at least partly defined by the body 38. The hollow portion 22 of the fastener of FIGS. 2 and 3 also extends through the head 36 of the fastener 16. This configuration can provide a venting path for gases that may be formed during the localized heating of the thermoplastic material during assembly of the components such that the above method may also include the step of venting gases (e.g., vaporized organic compounds) away from the interface 28 during the steps of heating and/or pressing. Venting can prevent otherwise compressed and trapped gas from pushing the fastener out of the first component, especially before the thermoplastic cools and resolidifies. Venting can also help prevent pockets of trapped gas that could reduced surface contact between the material of the first component 12 and the fastener 16 in the finished assembly 10. Each of the fasteners 16 of FIGS. 1-3 also includes a stress concentrator 42 at the end 40 of the fastener 16 that may serve to locally increase the locally applied stress during the beginning of the step of pressing by providing a reduced contact area—i.e., point or line contact rather than surface contact—between the end 40 of the fastener 16 and the first component 12.

The fasteners 16 of FIGS. 2 and 3 each include undercut features 44, 44' along which the thermoplastic of the first component can flow during assembly and subsequently cool and solidify to provide a mechanical interlock 46 (see FIG. 5) that increases the retaining force of the joint 18, which may be generally defined as the tensile force along axis A required to separate the components 12, 14 from each another.

In the example of FIG. 2, the undercut features are in the form of apertures 44 formed through the body 38 at a portion of the fastener 16 that is to be embedded in the thermoplastic material of the first component 12 at the formed joint 18. The illustrated apertures 44 are generally perpendicular to the axis A and uniform in size and direction as they extend between the internal and external surfaces 32, 34 of the body 38. During the step of pressing, the material of the first component flows into and through the apertures 44 to form the mechanical interlock. The material may flow in one or both radial directions through the apertures depending on the nature of the particular flow field and pressure distribution along the fastener body 38 during assembly. In some embodiments, the apertures 44 are in the form of elongated slots formed through the body 38. The slots may be elongated in the longitudinal direction, the circumferential direction, or in an off-axis direction.

In the example of FIG. 3, the undercut features are in the form of internal threads 44' formed along the internal surface 32 of the body 38, along at least a portion of the fastener 16 that is to be embedded in the thermoplastic material of the first component 12 at the formed joint 18. Undercut features such as threads may also be provided along the external surface 34 of the body 38 in some cases. During the step of pressing, the material of the first component flows into the hollow portion 22 from the end 40 of the fastener 16 and along the threaded internal surface 32. The threads 44' may also induce a spiral flow field about the axis A to arrive at a joint 18 having reinforcements such as fibers oriented in a large plurality of angles and directions with respect to the axis A.

Figure 4:
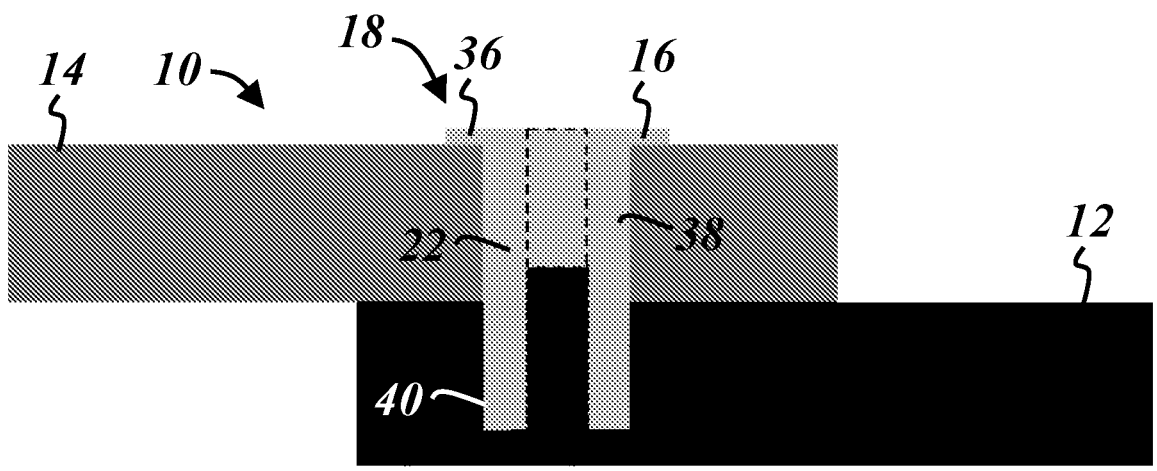
FIG. 4 is a cross-sectional view of an example of the composite assembly with a fastener that is hollow along its entire length.

With reference to FIG. 4 and continued reference to FIG. 1, some embodiments of the assembly 10 are constructed with the end 40 of the fastener 16 embedded in the material of the first component. In the example of FIG. 4, the hollow portion 22 of the fastener extends entirely through the fastener 16—i.e., through the head 36 and the body 38—in a lengthwise or longitundal direction, similar to the configuration of the fasteners of FIGS. 2 and 3. The particularly illustrated fastener 16 of FIG. 4 does not include stress concentrators at the end 40 of the fastener, but any of the individual above-described fastener features may be employed in any combination.

Figure 5:
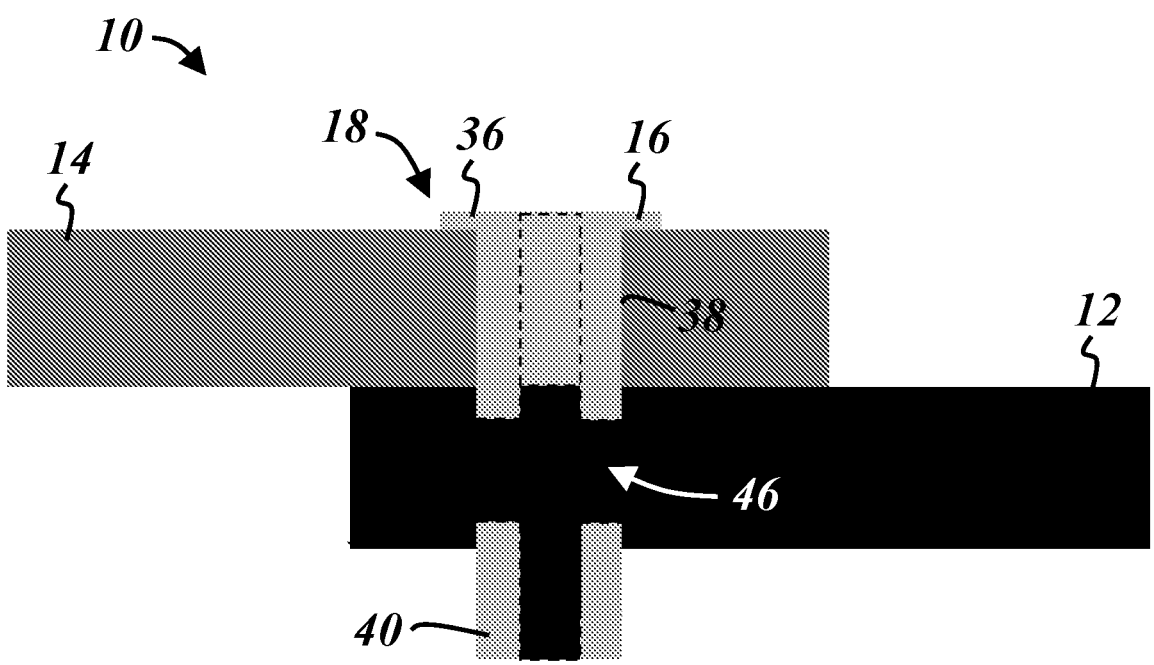
FIG. 5 is a cross-sectional view of an example of the composite assembly with a fastener that extends entirely through both components of the assembly.

In the example of FIG. 5, the fastener 16 is of sufficient length to pierce the first component 12 during assembly and may be described as a self-piercing rivet, albeit with distinct differences from known self-piercing rivets. In this example, the body 38 of the fastener extends from the shoulder 24 at one side of the assembly 10 or joint 18 to a free end 40 at an opposite side of the assembly 10 or joint. As already noted, this example also includes a mechanical interlock 46 at apertures 44 formed through the body 38 of the fastener 16 such that some of the reformed thermoplastic material or composite material extends into the hollow portion 22 of the fastener where embedded.

In embodiments where the material of the first component 12 is a thermoplastic composite comprising reinforcing fibers, one benefit of the above-described method of forming the joint 18 and making the assembly 10 is the localized reorientation of the fibers in the thermoplastic matrix. With reference to FIG. 1, for example, fibers of sufficient length may self-orient in the induced thermoplastic flow field 26 such that in the finished assembly 10, the fibers in the hollow portion 22 are generally aligned with the internal surface 34—i.e., in the longitudinal direction of the fastener 16, thereby providing maximized composite strength in that particular tensile direction of the joint 18. In embodiments with apertures 44 or other undercut features along the body 38 of the fastener 16, fibers may self-orient along these features as well such that the bending strength of the composite material contained in the apertures 44 is maximized in opposition to a tensile separation force applied to the components 12, 14 along the longitudinal axis A. Fibers flowing along the threads 44' may result in a combination or balance of increased tensile strength in the longitundal direction and localized bending strength at the threads in opposition to the tensile force.

In all of the illustrated examples, the retaining force of the joint 18 is provided along some portion of the length of the fastener body 38, whether by frictional forces, adhesive forces, mechanical interlocks, or combinations thereof. In these examples, the width or diameter of the body 38 of the fastener 16 is constant along the entire length of the body from the shoulder 24 to the end 40. Particularly distinguishing the fastener 16 from conventional self-piercing rivets—indeed from rivets in general—the embedded portion of the fastener and the end 40 of the fastener has a constant width or diameter, whether the end 40 is embedded (FIGS. 1 and 4) or not (FIG. 5). Conventional rivets rely on the end of the rivet opposite the head of the rivet being larger than the portion extending between the head and the end. Thus, the assembly process for conventional rivets inserted through pre-formed holes in two pieces to be joined relies on a secondary operation in which the opposite end of the rivet is flattened or "mushroomed" for retaining force, while conventional self-piercing rivets rely on controlled deformation of the opposite end of the rivet for retaining force. While it may be possible to combine some of these features with the fastener and joint described herein, they are not necessary, enabling a much simpler fastening operation and joint formation.

Some specific but non-limiting examples of certain features of the composite assembly and method are provided below, along with certain advantages of the method and resulting composite assembly. While presented in the context of automobile or vehicle body structures, the methods, joints, and assemblies described herein are not limited to use in vehicles. Another exemplary application includes aerospace applications, such as lightweight aircraft structures.

In one example, the above-described method is part of a vehicle body-in-white to (BIW) process for joining carbon fiber composites to lightweight metals, such as aluminum, AHSS, or magnesium. The method may be referred to as injection riveting and is capable of overcoming certain problems with joining metals and composites at the process level, such as the natural incompatibility of polymeric-metallic interfaces, and can be implemented on the existing BIW mass production infrastructure using robotic welding and assembly. The above method is useful for helping vehicle manufactures achieve federal fuel-efficiency rules mandating that automakers meet Corporate Average Fuel Economy (CAFE) standards of 54.5 miles per gallon by the year 2025, as reduced vehicle weight is one effective approach toward achieving such fuel efficiency. It is estimated that every 10% reduction in vehicle weight can result in a 6-8% fuel efficiency improvement for automobiles. Composite body structures and multi-material construction are considered effective approaches toward vehicle weight reduction since the BIW represents 23-28% of total vehicle weight. With lightweight multi-material construction of vehicle structures, a total of 9.2-11.2% vehicle weight reduction may be achieved with no increase in manufacturing cost compared with conventional composite-to-metal joints.

During the injection riveting process, a displaced volume of composite material flows into the hollow portion of the rivet or fastener via the end opposite the rivet head. The thermoplastic composite flows due to a pressure gradient created when forcing the rivet into the composite with the localized heating. The rivet travel distance and pressure can be optimized depending on the thermal conductivity of the joined materials. The rivet can have different features, such as the above-described undercut features, leading to different interlocking mechanisms, which can be tailored suitable for light-duty, medium-duty or heavy-duty applications.

The method has been successfully performed to produce suitable joints at the coupon level using a 3 mm thickness carbon fiber reinforced composite (composite fiber strength 180 MPa, composite fiber modulus 20 GPa and composite fiber strain 2%) and 1-3 mm thickness aluminum sheet and 3 mm high strength steel sheet.

In one embodiment, the composite assembly is or includes a CFC assembly, including an advanced high strength aluminum tube with a cross-side beams made of advanced high strength steel joined with a section of CFC panel roof structure. The method of fabrication of the assembly may include use of a robot arm to locate, place, and press the fastener(s) into place to form the joint(s). It is believed that a joint flexural strength of at least 150 MPa is attainable, along with a lap shear tensile strength of at least 50 MPa. It is also believed that a process cycle time of about 8 seconds or less (for aluminum to CFC) or 4 seconds or less (for AHSS to CFC is attainable for each formed joint at an estimated cost of $0.40 per formed joint. In another embodiment, a multi-head robot-arm is employer to simultaneously form multiple joints with multiple fasteners, further reducing the per-joint cost.

These performance capabilities are in line with conventional for metal-to-metal joint formation, such as resistance spot welding and laser welding, employed in the assembly of body-in-white structures, in which 3000 to 7000 weld spots are used to join together up to 200 sheet metal parts, depending on the size of the vehicle. The fatigue strength of the joint described herein is equal to or greater than the shear strength of the fastener, which can be fabricated from the same material as the sheet metal (e.g., steel or advanced high strength aluminum) to avoid corrosion, by deep drawing or extrusion processes. The method can be characterized as a one-side joining technique, making it a versatile method easily adapted for implementation with existing assembly line robotics without the need for accessing the opposite side of the assembled components.

Previously listed conventional joining techniques for polymer-metal hybrid structures have limitations due to the natural incompatibility of the materials to be joined and the complexity of the joining processes—with complexity leading to high costs. For example, self-piercing rivets (SPR) require the use of a counter-acting die in order to deform the end of the rivet opposite the rivet head. SPR must often be used in combination with adhesive materials to provide dimensional control and stability. Adhesive bonding generally requires that the materials being joined have similar coefficients of thermal expansion to provide a suitable joint, which is not the case with thermoplastic composites and high strength or lightweight metals. Rivet-weld joining, has some of the advantages of self-piercing riveting and of resistance spot welding when joining two sheets of dissimilar materials. But its application is also limited due to the effect of electric current melting the composite polymeric matrix at the formed joint. These techniques also all require access to the desired joint location from multiple directions, such as from the rivet insertion side and from the opposite side of the components to be joined, which limits their implementation on assembly lines.

Ultrasonic metal welding and friction spot joining are alternatives to SPR, rivet-welding, and adhesives, but the non-metallurgical interface between dissimilar materials such as metal and CFC lead to weak and/or inconsistent joints varying in strength by up to 27 MPa strength in lap shear. Limitations on the size of the required sonotrode is another obstacle in ultrasonic bonding techniques.

The method disclosed herein may be based on thermally induced material flow and/or mechanical interlocking between fastener features and the composite material, thereby preserving the structural integrity of the composite. The counter part of the fastener may be a flat surface, and it joint formation is faster and at least as cost-effective compared with the conventional techniques.

The ability to cost-effectively form robust joints between lightweight metals and polymer-based composites can lead to a possible 40% weight reduction for BIW structures, as illustrated in Table I, by using passenger compartment frame and front-end structures fabricated from series 6xxx or 7xxx aluminum and cross-side beams fabricated from AHSS joined with a roof structure, underbody floor structure, and panels fabricated from CFC. Table I is taken from "Automotive Materials in the 21$^{st}$ Century" by William F. Powers, published in Advanced Materials and Processes in May 2000 at pages 38-41. In arriving at a possible 40% weight reduction, the passenger compartment frame and the cross and side beams were taken to represent about 20% of total BIW mass, while the remaining components were taken to represent about 80% of total BIW mass.

TABLE I

| BIW Component | Lightweight Material | Material Replaced | Mass Reduction |
| --- | --- | --- | --- |
| Passenger compartment frame | Aluminum | Aluminum | 10% |
| Cross and side beams | High strength steel | Mild steel | 10% |
| Roof structure | Graphite FRP composite | Steel | 50-60% |
| Front-end structure | Aluminum | Steel, cast iron | 40-60% |
| Underbody floor structure | Graphite FRP composite | Steel | 50-60% |
| Panels | Graphite FRP composite | Steel | 50-60% |

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of joining materials, comprising the steps of:
   layering a first component comprising a thermoplastic with a second component such that the first component covers an opening formed through the second component;
   pressing a metal fastener against the first component through the opening in the second component; and
   heating the thermoplastic at an interface of the metal fastener and the first component so that a portion of the thermoplastic flows into a hollow portion of the metal fastener during the step of pressing, wherein a portion of the thermoplastic remains within the first component, adjacent the opening, and wherein a portion of the metal fastener is embedded in the thermoplastic and a joint is formed that attaches the first and second components together when the thermoplastic is cooled.

2. The method of claim 1, wherein the step of heating is performed before the step of pressing.

3. The method of claim 1, wherein the thermoplastic flows into the hollow portion of the metal fastener at an end of the metal fastener during the step of pressing.

4. The method of claim 1, wherein an end of the metal fastener is embedded in the first component at the formed joint.

5. The method of claim 1, further comprising the step of piercing the first component with the metal fastener.

6. The method of claim 1, wherein the thermoplastic flows through an aperture formed through a body of the metal fastener during the step of pressing to form a mechanical interlock between the thermoplastic and the metal fastener when the joint is formed.

7. The method of claim 1, wherein the metal fastener includes an undercut feature along the hollow portion to form a mechanical interlock between the thermoplastic and the metal fastener when the joint is formed.

8. The method of claim 1, further comprising the step of venting gas away from the heated thermoplastic.

9. The method of claim 1, wherein the first component comprises a composite material including the thermoplastic and reinforcing fibers, and the second component comprises sheet metal.

10. The method of claim 1, wherein the first component comprises reinforcing fibers and the method further comprises the step of changing the orientation of some of the reinforcing fibers during the step of pressing.

11. A composite assembly, comprising:
    a first component comprising a thermoplastic;
    a second component having an opening extending therethrough from a first side that faces the first component to an opposite second side; and
    a metal fastener attaching the components together, the metal fastener having a shoulder at the second side of the second component and a hollow body extending from the shoulder and through the opening of the second component, wherein a portion of the thermoplastic has flowed into the hollow body of the metal fastener, wherein a portion of the thermoplastic remains within the first component, adjacent the opening, and wherein the hollow body is at least partly embedded in and filled with the thermoplastic of the first component.

12. A composite assembly as defined in claim 11, wherein the opening through the second component is sized for clearance between the hollow body and the second component.

13. A composite assembly as defined in claim 11, wherein the hollow body extends from the shoulder to an end that is embedded in the first component.

14. A composite assembly as defined in claim 11, wherein the hollow body extends from the shoulder and through the first component to a free end.

15. A composite assembly as defined in claim 11, wherein the metal fastener comprises an aperture formed through the hollow body, the thermoplastic extending through the aperture to form a mechanical interlock between the first component and the metal fastener.

16. A composite assembly as defined in claim 11, wherein the metal fastener comprises an undercut feature embedded in the thermoplastic that forms a mechanical interlock between the first component and the metal fastener.

17. A composite assembly as defined in claim 11, wherein the metal fastener comprises a head with the hollow body extending in a lengthwise direction from the head to an end and an opening extending through the entire length of the metal fastener through the hollow body and the head.

18. A composite assembly as defined in claim 11, wherein the first component comprises a composite material including the thermoplastic and reinforcing fibers, at least some of the reinforcing fibers being aligned with internal and external surfaces of the hollow body.

19. A composite assembly as defined in claim 11, wherein the second component comprises sheet metal.

20. A composite assembly as defined in claim 11, wherein the hollow body extends from the shoulder to an end that has a diameter no larger than the remainder of the hollow body.

\* \* \* \* \*